US012736417B2

(12) United States Patent
Xie et al.

(10) Patent No.: US 12,736,417 B2
(45) Date of Patent: Sep. 15, 2026

(54) PROBE

(71) Applicant: Shenzhen Yingboweiye Technology Co., Ltd, Shenzhen (CN)

(72) Inventors: Jinghua Xie, Shenzhen (CN); Zhiyong Fang, Shenzhen (CN)

( * ) Notice: Subject to any disclaimer, the term of this patent is extended or adjusted under 35 U.S.C. 154(b) by 329 days.

(21) Appl. No.: 18/391,786

(22) Filed: Dec. 21, 2023

(65) Prior Publication Data

US 2025/0109994 A1 Apr. 3, 2025

(30) Foreign Application Priority Data

Sep. 28, 2023 (CN) ......................... 202322672531.2

(51) Int. Cl.
*G01K 13/00* (2021.01)
*G01K 1/08* (2021.01)

(52) U.S. Cl.
CPC ............... *G01K 13/00* (2013.01); *G01K 1/08* (2013.01); *G01K 2207/06* (2013.01)

(58) Field of Classification Search
CPC ....... G01K 13/00; G01K 1/08; G01K 2207/06
See application file for complete search history.

(56) References Cited

U.S. PATENT DOCUMENTS

2012/0225170 A1* 9/2012 Sonnendorfer ........... F24C 7/08 116/216
2014/0269829 A1* 9/2014 Bronczyk ............. G01D 21/00 374/152
2019/0049314 A1* 2/2019 Chu ....................... G01K 13/00
2020/0096393 A1* 3/2020 Lion ...................... G01K 1/024
2020/0141813 A1* 5/2020 Nivala ................... G01K 13/00
2020/0187900 A1* 6/2020 Seitel ................... A61B 8/4209
2021/0180797 A1* 6/2021 Bhogal ................... A47J 27/04
2022/0225070 A1* 7/2022 Daoura ................. H04W 4/029
2023/0213392 A1* 7/2023 Wang ..................... G01K 1/024 374/175
2023/0228627 A1* 7/2023 Stein ...................... G01K 1/024 374/208
2024/0310215 A1* 9/2024 Wang ..................... G01K 1/024

FOREIGN PATENT DOCUMENTS

CN 213902686 U 8/2021

OTHER PUBLICATIONS

European Patent Office, European Search Report issued in corresponding European Patent Application No. 23213655.6 on Apr. 29, 2026, 4 pages.

(Continued)

*Primary Examiner* — Laura Martin Sweeney
*Assistant Examiner* — Philip L Cotey
(74) *Attorney, Agent, or Firm* — Sandy Lipkin

(57) ABSTRACT

The present disclosure provides a probe, belonging to the technical field of food thermometer. The probe includes a tube body and a handle; a first mounting channel is defined at interior of the tube body, along a first direction, a first connecting part is arranged at one end of the tube body, and a probe part is arranged at the other end of the tube body to transmit heat through the probe part; a second connecting part is arranged at one end of the handle, and the first connecting part is connected to the second connecting part to define a containing cavity between the tube body and the handle.

10 Claims, 5 Drawing Sheets

(56) References Cited

OTHER PUBLICATIONS

European Patent Office, Communication pursuant to Article 94(3) EPC issued in the corresponding European Patent Application No. 23213655.6 on May 13, 2024, 13 pages.
European Patent Office, Communication pursuant to Article 94(3) EPC issued in the corresponding European Patent Application No. 23213655.6 on Jan. 30, 2026, 5 pages.

* cited by examiner

PROBE

CROSS-REFERENCE TO RELATED APPLICATIONS

The present application claims priority to Chinese patent application No. 2023226725312, entitled "Probe", filed to the China Patent Office on Sep. 28, 2023, the entire content of which is incorporated herein by reference.

TECHNICAL FIELD

The present disclosure relates to the technical field of a food thermometer, and in particular to a probe.

BACKGROUND ART

A present wireless probe food thermometer is connected by means of a probe steel tube via injection fixing with plastic together or the probe steel tube being fixed by gluing or other ways, but the injection molding or gluing fixation is not easy to dismantle later. When the steel tube is deformed or damaged, it is not easy to be dismantled, the repeated utilization rate is low, and repairing is difficult, which lead to the increase of user's cost of use and the cost of maintenance.

SUMMARY

In view of this, the present disclosure aims to overcome deficiencies in the prior art by providing a probe.

The present disclosure provides a technical solution as following: a probe, including:

a tube body, which defines a first mounting channel inside, wherein along a first direction, a first connecting part is arranged at one end of the tube body, and a probe part is arranged at other end of the tube body, so as to conduct heat through the probe part; and a handle, wherein a second connecting part is arranged at one end of the handle, and the first connecting part is connected to the second connecting part to define a containing cavity between the tube body and the handle.

In some embodiments of the present disclosure, the handle includes a body and a cover, the cover is arranged at the end of the body away from the tube body;

the body defines a second mounting channel, and the second mounting channel is communicated with the first mounting channel to form the containing cavity; and a third connecting part is arranged at the end away from the tube body of the handle, a fourth connecting part is arranged at one end of the cover, and the fourth connecting part is connected to the third connecting part.

Further, the first connecting part is a first thread, the second connecting part is a second thread, and the first connecting part is threadedly connected to the second connecting part.

Further, the third connecting part is a third thread, the fourth connecting part is a fourth thread, and the third connecting part is threadedly connected to the fourth connecting part.

Further, the first connecting part includes a plurality of convex, and the plurality of convex is arranged at intervals at a circumferential direction of the tube body;

the second connecting part comprises a plurality of clamping grooves, the plurality of clamping grooves are arranged at intervals at inner wall of the handle; and each of the convex is correspondingly snapped with one of the clamping grooves.

Further, the body is a ceramic body and the cover is a stainless-steel cover.

Further, an anti-slip layer is arranged at the surface of the body.

Further, the tube body is the stainless-steel tube.

Further, a shape of the probe part includes at least any one of a cone or a polygonal pyramid.

Further, the probe further includes an elastic member, a supercapacitor and a control board arranged in the containing cavity;

one end of the elastic member abuts against the probe part, and the other end of the elastic member abuts against the supercapacitor; and one end of the control board is connected to the supercapacitor, and the other end of the control board abuts against the handle.

Further, the elastic member includes at least any one of a spring, an air cushion, an elastic rubber, an elastic support.

Embodiments of the present disclosure has the following advantages: the probe provided by the present disclosure is removably connected through the handle and the tube body, which can not only improve the efficiency of connecting or dismantling the handle and the tube body, but also is easy to repair or replace, so as to reduce the user's cost of use.

In order to make the above purposes, features and advantages of the present disclosure more obviously and easy to be understood, the following prefer embodiments accompanying with the drawings are specially described in detail as follows.

BRIEF DESCRIPTION OF DRAWINGS

In order to more clearly describe the technical solution of the embodiments of the present disclosure, the following will briefly introduce the drawings to be used in the embodiments. It should be understood that the following drawings only show certain embodiments of the present disclosure, and therefore should not be regarded as a limitation of the scope of the present disclosure, and for the person of ordinary skill in the art, other relevant drawings can be obtained according to these drawings without creative labors.

REFERENCE NUMBERS

Figure 1:
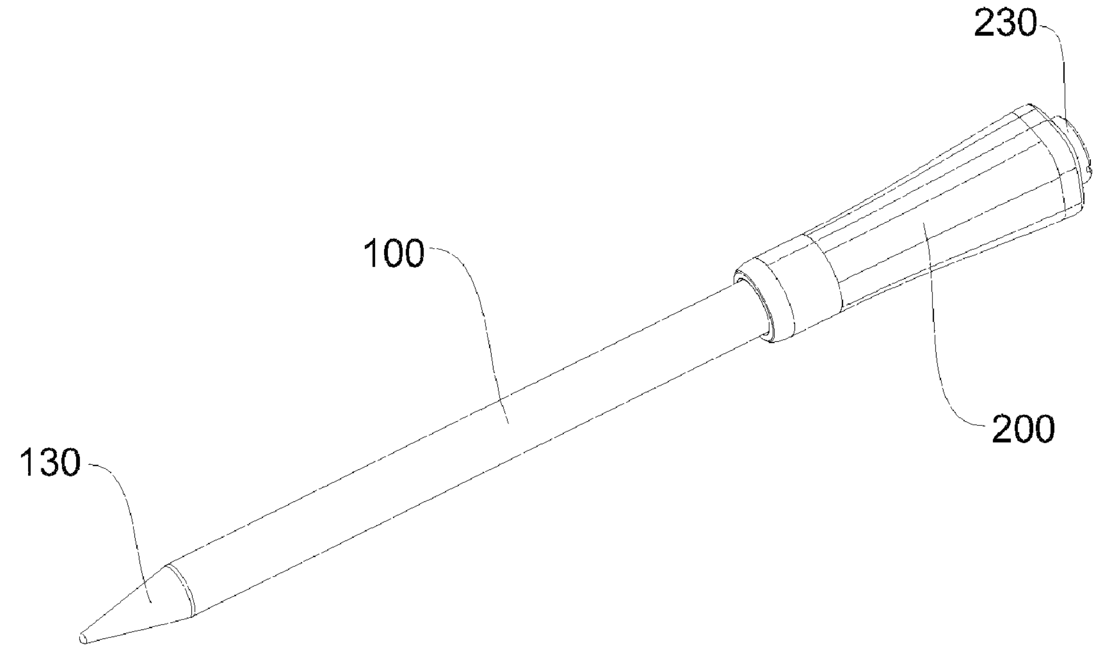
FIG. 1 shows a structure schematic diagram at one view of a probe provided by some embodiments of the present disclosure.

100—tube body; 110—first mounting channel; 120—first connecting part; 130—probe part; 200—handle; 210—second connecting part; 220—body; 230—cover; 231—fourth connecting part; 240—third connecting part; 250—second mounting channel; 300—elastic member; 400—supercapacitor; and 500—control board.

DETAILED DESCRIPTION OF EMBODIMENTS

Embodiments of the present disclosure are described in detail below, and examples of the embodiments are shown in the drawings, wherein the same or similar number throughout denotes the same or similar elements or elements with same or similar function. The embodiments described below referring to the drawings are exemplary and are intended only to explain the present disclosure and are not to be understood as a limitation of the present disclosure.

It should be noted that when the element is called as "fix" to the other element, the element may be directly on the other element or may exist a centered element. When an element is considered to be "connect" to the other element, the element may be directly connected to the other element or meanwhile the centered element may exist. In contrast, when the element is called as "directly on" the other element, the centered element does not exist. The terms "vertical", "horizontal", "left", "right" and similar expressions are used herein for illustrative purposes only. In the present disclosure, unless otherwise specific regulations and limitations, the terms "mount", "link", "connect", "fix" and the like shall be understood broadly, for example, it may be a fixed connection, a removably connected, or an integral; it may be a mechanical connection, or an electrical connection; it may be a direct connection, or an indirect connection through a centered medium, it may also be communicated inside through two elements or an interaction relationship between the two elements. For those of ordinary skilled in the art, the specific meanings of the above terms in the present disclosure may be understood on specific situations.

Furthermore, the terms "first", "second" are used for illustrative purposes only and may not be understood as indicating or implying relative importance, or implying to indicate the number of technical features. As a result, the feature defined as "first" or "second" may indicate or implicitly include one or more such features. In the description of the present disclosure, "plurality" means two or more, unless otherwise explicit and specific limitation.

Unless otherwise defined, all technical and scientific terms used herein have the same meaning as commonly understood by those skilled in the art belonging to the present disclosure. The terms used herein in the specification of template are for the purpose of illustrating specific embodiments only, and are not intended to limit the present disclosure. As used herein, the term "and/or" includes any and all combinations of one or more of the relevant listed items.

Figure 2:
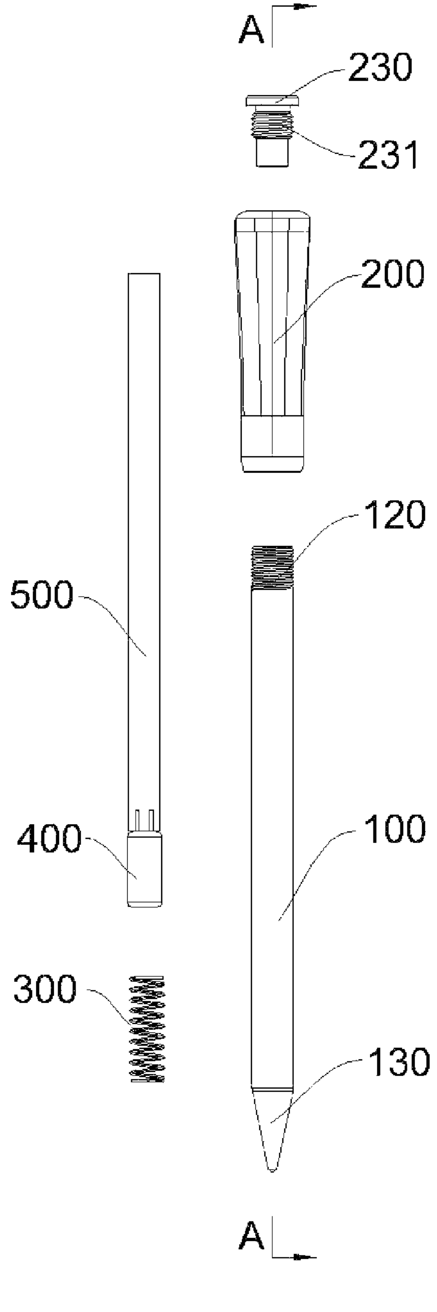
FIG. 2 shows an explosion diagram of the probe provided by some embodiments of the present disclosure.
Figure 3:
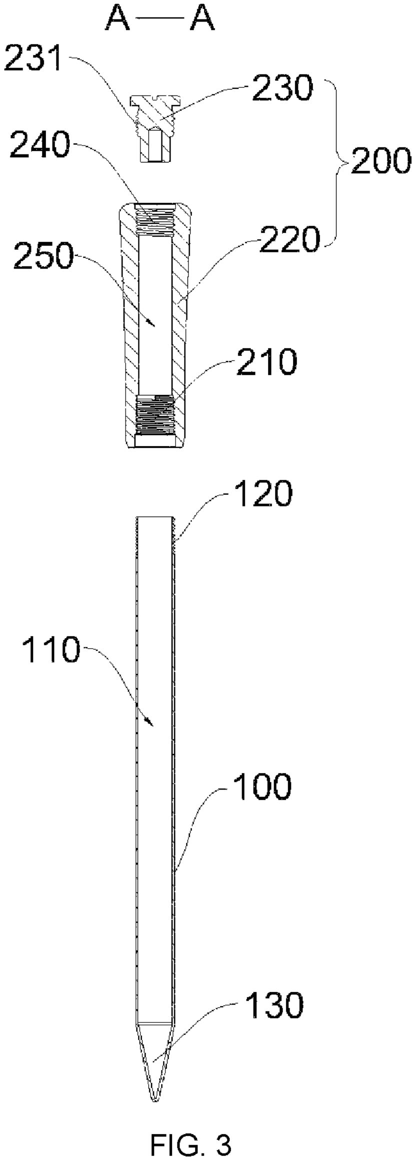
FIG. 3 shows a sectional diagram of part A-A in FIG. 2.

As shown in FIG. 1 to FIG. 3, some embodiments of the present disclosure provide a probe, which is mainly applied in temperature detection probe to improve the installation or removal efficiency of the probe, and reduce the maintenance or replacement cost.

The probe includes the body 100 and the handle 200. It needs to be noted that in the embodiment, the tube body 100 is removably connected to the handle 200, specifically, the connection way between the tube body 100 and the handle 200 includes at least any one of threaded connection, snapping connection, magnetic connection, and bolt connection.

Specifically, the interior of the tube body 100 defines the first mounting channel 110, and the first mounting channel 110 is disposed along an axial direction of the tube body 100.

Along the first direction, the first connecting part 120 is arranged at one end of the tube body 100, and the probe part 130 is arranged at the other end of the tube body 100 to contact an external object through the probe part 130, so as to conduct heat from the external object to the probe part 130.

It may be understood that along the first direction, the first connecting part 120 and probe part 130 are arranged at each end of the tube body 100. It is to be noted that the first direction is the axial direction of the tube body 100.

It is noted that the probe part 130 includes at least any one of the cone or the polygonal pyramid, the probe part 130 coincides with the axis of the tube body 100, and a tip of the probe part 130 is towards the side of the tube body away from the first connecting part 120, so that the probe part 130 can be efficiently inserted into the interior of the food, so as to improve the efficiency of the heat conduction and the quality of the heat conduction of the probe part 130.

Additionally, the shape of the tube body 100 includes at least any of a cylindrical shape and a polygonal cylindrical shape.

The embodiment illustrates specifically through that the shape of the tube body 100 is a cylindrical shape, and additionally, the shape of the probe part 130 is the cone. Furthermore, a diameter of the tube body 100 is equal to the diameter of the side of the probe part 130 towards the tube body 100, so as to improve the connective smoothness between the tube body 100 and the probe part 130.

In the embodiment, along the axial direction of the handle 200, the second connecting part 210 is arranged at the end of the handle 200, and the first connecting part 120 is correspondingly connected to the second connecting part 210 to define the containing cavity between the tube body 100 and the handle 200, so that the handle 200 is connected to the tube body 100.

It is noted that the connection way between the first connecting part 120 and the second connecting part 210 at least include any one of the threaded connection, snapping connection, magnetic connection, and bolt connection.

The removably connection between the handle 200 and the tube body 100 can not only improve the connecting or removing efficiency of the handle 200 and the tube body 100, but make it easy to repair or replace the probe, so as to reduce the user's cost of use.

As shown in FIG. 2 and FIG. 3, in some embodiments of the present disclosure, the handle 200 includes the body 220 and the cover 230, the body 220 is removably connected to the cover 230, wherein the cover 230 is arranged at the end of the body 220 away from the tube body 100.

The interior of the body 220 defines the second mounting channel 250, the second mounting channel 250 is arranged along the axial direction of the body 220, the second mounting channel 250 passes through the body 220 along the axial direction of the body 220, and the second mounting channel 250 is communicated with the first mounting channel 110 to form the containing in cavity.

Specifically, the third connecting part 240 is arranged at the end of the handle 200 away from the tube body 100, the fourth connecting part 231 is arranged at the end of the cover 230, and the fourth connecting part 231 is connected to the third connecting part 240, so that the cover 230 is connected to the body 220 to form the handle 200.

In the embodiment, the connection way between the third connecting part 240 and the fourth connecting part 231 at least includes any one of the threaded connection, snapping connection, magnetic connection, and bolt connection, i.e., the connection way between the body 220 and the cover 230 includes at least includes any one of the threaded connection, snapping connection, magnetic connection, and bolt connection.

The removable connection between the body 220 and the cover 230 facilitates the assembling and removing between the body 220 and the cover 230.

Additionally, in some embodiments, the shape of the body 220 includes at least any one or a combination of two and more of the cylindrical shape, elliptical cylindrical shape, or polygonal cylindrical shape, which may be specifically disposed according to the actual situation.

Preferably, in the embodiment, the shape of the body 220 is a regular quadrilateral prism structure, so as to improve the stability of the user handholding the handle, and thus improve the stability when the user uses the probe.

As shown in FIG. 2 and FIG. 3, in some embodiments of the present disclosure, the first connecting part 120 is the first thread, the second connecting part 210 is the second thread, and the first connecting part 120 is threadedly connected to the second connecting part 210. It can not only improve the connecting stability between the first connecting part 120 and the second connecting part 210, but also improve the installation or removement efficiency between the tube body 100 and the handle 200.

It may be understood that if the first thread is an internal thread, the second thread is an external thread. If the first thread is the external thread, the second thread is the internal thread.

As shown in FIG. 2 and FIG. 3, in some embodiments of the present disclosure, the third connecting part 240 is the third thread, the fourth connecting part 231 is the fourth thread, and the third connecting part 240 is threadedly connected to the fourth connecting part 231. It can not only improve the connecting stability between the third connecting part 240 and the fourth connecting part 231, but also improve the installation or removement efficiency between the body 220 and the cover 230.

It may be understood that if the third thread is the internal thread, the fourth thread is the external thread. If the third thread is the external thread, the fourth thread is the internal thread.

It is to be noted that in the embodiment, a limiting groove is arranged at the side of the cover 230 away from the body 220, so that the end of a screw driver may be clamped in the clamping groove to facilitate installation or removement between the body 220 and the cover 230.

Additionally, in some embodiments of the present disclosure, the first connecting part 120 includes a plurality of convex, the plurality of convex is arranged at intervals at circumferential direction of the tube body 100, the distances of two adjacent convex to the center are equal, and the plurality of convex is centrally symmetrical with the axis of the first connecting part 120. Additionally, the second connecting part 210 includes a plurality of clamping grooves, the plurality of clamping grooves are at intervals arranged at the inner wall of the handle 200, and the plurality of clamping grooves are evenly distributed on the inner wall of the handle 200 along the circumferential direction of the handle 200.

In the embodiment, the number of the convex is equal to the number of the clamping grooves, and each of the convex is correspondingly snapped with one clamping groove, and the outer wall of the convex abuts against the inner wall of the clamping groove, which is to improve the connecting stability between the first connecting part 120 and the second connecting part 210, and thereby improve the connecting stability between the tube body 100 and the handle 200.

It is to be noted that the convex is an elastic convex, so that during the process of connecting the first connecting part 120 to the second connecting part 210, the convex can be compressed under an extrusion of the handle 200. At this time, the convex stores an elastic potential energy, and thereby enables the end of the handle 200 near the second connecting part 210 to be sleeved on the end of the tube body 100 near the first connecting part 120. When the convex corresponds to the clamping groove, the convex returns to the initial state under the action of the elastic potential energy, and thereby enables the convex to abut against the clamping groove, so as to improve the connecting stability between the first connecting part 120 and the second connecting part 210, as well as the installation or removement efficiency between the first connecting part 120 and the second connecting part 210.

Figure 4:
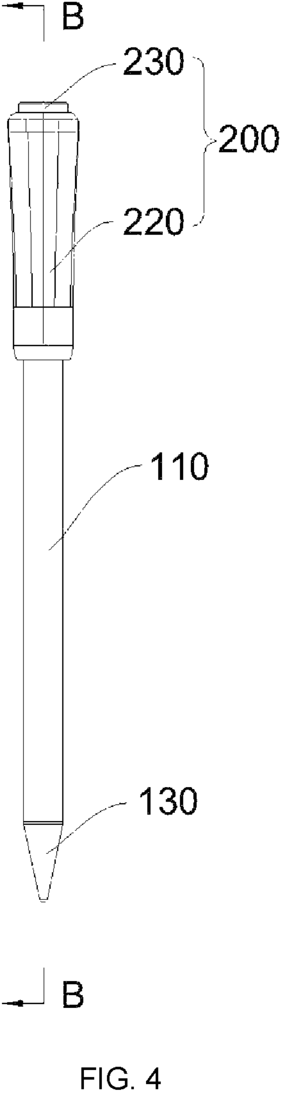
FIG. 4 shows a structure schematic diagram at other view of the probe provided by some embodiments of the present disclosure.
Figure 5:
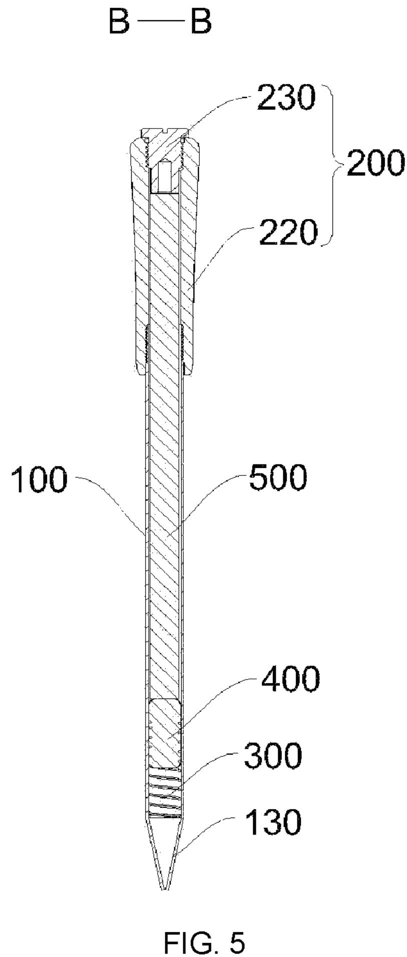
FIG. 5 shows a sectional diagram of part B-B in FIG. 4.

As shown in FIG. 4 and FIG. 5, in some embodiments of the present disclosure, the probe further includes the elastic member 300, supercapacitor 400, and the control board 500 disposed in the containing cavity.

It may be understood that, the removably connection between the handle 200 and the tube body 100 can improve the installation or removement efficiency of the elastic member 300, the supercapacitor 400, and the control board 500 between the handle 200 and the tube body 100, which is easy to repair or replace, so as to reduce the cost of use.

The supercapacitor 400 is arranged between the elastic member 300 and the control board 500.

Specifically, the elastic member 300 is arranged in the first mounting channel 110, the end of the elastic member 300 near the probe part 130 abuts against the probe part 130, and the end of the elastic member 300 away from the probe part 130 abuts against the supercapacitor 400, so that the elastic member 300 provides an elastic force action for the supercapacitor 400 along the axial direction of the first mounting channel 110.

Additionally, the end of the control board 500 is electrically connected to the supercapacitor 400 to supply power to the control board 500 through the supercapacitor 400, and the other end of the control board 500 abuts against the handle 200. In this way, the handle 200 forms a position limitation for the end of the control board 500 away from the elastic member 300, so as to improve the stability of the control board 500 in the containing cavity.

Specifically, in the embodiment, the end of the control board 500 away from the elastic member 300 passes through the second mounting channel 250, which abuts against the side of the cover 230 toward the body 220. It may be understood, since the end of the control board 500 away from the cover 230 is connected to the supercapacitor 400 and the supercapacitor 400 abuts against the elastic member 300, the end of the control board 500 away from the cover 230 abuts against the elastic member 300 through the supercapacitor 400.

In the embodiment, along the axial direction of the probe, a length sum of an original length of the elastic member 300, the length of the supercapacitor 400, and the length of the control board 500 is greater than the length of the containing cavity. In this way, when the elastic member 300, the supercapacitor 400 and the control board 500 are arranged in the containing cavity, the elastic member 300 is in a compressed state and stores the elastic potential energy. That is, the elastic member 300 has the elastic force to the supercapacitor 400, so that the end of the control board 500 away from the elastic member 300 is able to abut against the cover 230, which avoids the elastic member 300, the supercapacitor 400 and the control board 500 from shaking in the containing cavity, so as to improve the stability of the control board 500, the elastic member 300 and the supercapacitor 400 in the containing cavity.

Preferably, in the embodiment, the tube body 100 and handle 200 are connected by threads, so that during the process of threaded connection between the tube body 100 and the handle 200, the length of the containing cavity can be adjusted through adjusting the distance of threaded connection between the tube body 100 and the handle 200. When the length of the containing cavity is longer, an elastic deformation of the elastic member 300 is smaller, that is the elastic potential energy is smaller, which means that a resistance force between the control board 500 to the cover 230 is smaller under the elastic force action of the elastic member 300. When the length of the containing cavity is longer, the elastic deformation of the elastic member 300 is larger, that is the elastic potential energy is larger, which means that the resistance force between the control board 500 to the cover 230 is larger under the elastic force action of the elastic member 300.

It may be understood that by adjusting the distance between the tube body 100 and the handle 200, the deformation capacity of the elastic member 300 can be effectively adjusted, so as to adjust and control the elastic force of the elastic member 300 to the supercapacitor 400 and the control board 500, which can not only improve the connecting stability between the tube body 100 and the handle 200 and the installation or removement efficiency, but also control the stability of the supercapacitor 400 and the control board 500 in the containing cavity, so that the probe is easy to be repaired or replaced, and the cost of use and maintenance is reduced.

Further, the elastic member 300 includes at least any one of the spring, air cushion, elastic rubber, elastic support, which may be specifically set according to the actual situation.

Preferably, as shown in FIG. 2 and FIG. 5, in some embodiments of the present disclosure, the elastic member 300 is the spring. The spring is a splendid elastic part with features of easy deformation and large elasticity, wherein a size of elastic force of the spring is in direct proportion to an elongation of the spring.

It is to be noted that, in the embodiment, the control board 500 is a PCB board, that is, a printed circuit board.

The supercapacitor 400 generally refers to an electrical double-layer capacitor (EDLC). The electrical double-layer capacitor is a type of supercapacitor, which is a new type of energy storage device. The electrical double-layer capacitor is between battery and capacitor, and a great capacity of which can be fully used as the battery. Compared with the battery of using electrochemistry principle, the charging and discharging process of the electrical double-layer capacitor does not relate any material changes at all. Therefore, the electrical double-layer capacitor has features of short charging time, long service life, good temperature characteristic, energy saving and green environmental protection, etc.

In some embodiments of the present disclosure, the tube body 100 is a stainless-steel tube, and since both the probe part 130 and the first connecting part 120 are part of the tube body 100, the probe part 130 and the first connecting part 120 are both made of stainless-steel material. It should be noted that the stainless-steel has good corrosion resistance, excellent strength and toughness, and splendid processing performance, which can contact with food and the food hygiene can be ensured. At the same time, the stainless-steel has a large thermal conductivity coefficient and an excellent thermal conductivity performance, which can effectively and quickly transfer heat and improve thermal efficiency.

It may be understood that, the tube body 100 is made of the stainless steel to improve the heat transmission efficiency of the tube body 100, and avoid the case of corrosion or rust of the tube body 100, so as to prolong the service life of the tube body 100.

Additionally, a thickness of the tube body 100 may be specifically set according to the actual situation and is not specifically limited in the embodiment. The thickness of the tube body 100 is a difference between an outside diameter of the tube body 100 and an inside diameter of the tube body 100.

It is noted that reducing the thickness of the tube body 100 is able to further effectively improve the thermal efficiency of the tube body 100. Further, increasing the thickness of the tube body 100 appropriately may not only effectively ensure the thermal efficiency of the tube body 100, but also effectively enhance the overall strength of the tube body 100.

Preferably, in the embodiment, the tube body 100 is a food-grade stainless-steel tube, so that the tube body 100 may direct contact with the food, which is more in compliance with food safety requirement.

The food-grade stainless steel has a high degree of finish at interior and exterior, which is easy to be cleaned and is corrosion resistance. The liquid medium retention amount of the surface inside the tube is smaller, which is convenient to be washed.

In some embodiments of the present disclosure, the body 220 is the ceramic body.

It should be noted that the ceramic has many advantages, such as excellent insulation, corrosion resistance, high temperature resistance, high hardness, low density, and radiation resistance.

It is to be understood that the body 220 of the handle 200 is made of the ceramic material, so that during the process of the user contacting the body 220, the ceramic body can play a role of isolating the body temperature of the user, so as to prevent the body temperature of the user from being transmitted to the probe part 130 of the tube body 100 through the handle 200, and thus ensure the accuracy of the probe for the food temperature detection.

Additionally, the cover 230 is the stainless-steel cover, which can transmit heat by the stainless steel.

Further, the anti-slip layer is arranged at the outer wall of the body 220, and the anti-slip layer includes at least any one of a frosted layer, and an anti-slip particle layer, so as to improve the stability of during the process of the user holding the handle 200, and thereby avoid the case of hand-slip.

Exemplarily, in some embodiments, the first connecting part 120 is a first magnet and the second connecting part 210 is a second magnet, and the magnetism between the first magnet and the second magnet is different, i.e., the first magnet and the second magnet are oppositely polarized to attract each other. Therefore, the handle 200 is magnetically connected to the tube body 100, and connecting the handle 200 to the tube body 100 by means of magnet can further improve the connection or removement efficiency of the handle 200 and the tube body 100.

Preferably, the first magnet and the second magnet are both permanent magnets to improve the connecting stability between the first connecting part 120 and the second connecting part 210, so as to improve the connecting stability between the handle 200 and the tube body 100.

Optionally, in some embodiments, the third connecting part 240 is a mounting groove, and the fourth connecting part 231 is an elastic convex. When the third connecting part 240 is connected to the fourth connecting part 231, the elastic convex is able to be clamped in the mounting groove, and the outer wall of the elastic convex abuts against the inner wall of the mounting groove, so as to improve the connecting stability between the third connecting part and the fourth connecting part, and thereby improve the installation or removement efficiency between the body 220 and the cover 230.

In all of the examples shown and described herein, any specific values should be illustrated as merely exemplary, and not as a limitation, and thus other examples of the exemplary embodiments may have different values.

It should be noted: similar symbols and letters denote similar items in the following drawings, so that once an item is defined in a drawing, no further definition or explanation of the item is required in the subsequent drawings.

The embodiments described above express only several implementations of the present disclosure, which are described in a more specific and detailed manner, but are not to be understood as limitations of the scope of the present disclosure. It should be noted that, for those ordinary skilled in the art, a plurality of deformations and improvements can be made without departing from the conception of the present disclosure, and which shall all fall within the scope of protection of the present disclosure.

What is claimed is:

1. A probe, comprising:

a tube body, which defines a first mounting channel inside, wherein along a first direction, a first connecting part is formed at one end of the tube body, and a probe part is arranged at other end of the tube body, so as to conduct heat through the probe part; and a handle, wherein a second connecting part is formed at one end of the handle, and the first connecting part is connected to the second connecting part to define a containing cavity between the tube body and the handle, wherein the probe further comprises an elastic member, a supercapacitor and a control board arranged in the containing cavity;

one end of the elastic member abuts against the probe part, and the other end of the elastic member abuts against the supercapacitor; and one end of the control board is connected to the supercapacitor, and the other end of the control board abuts against the handle.

2. The probe according to claim 1, wherein the handle comprises a body and a cover, wherein the cover is arranged at one end of the body away from the tube body;

the body defines a second mounting channel, and the second mounting channel is communicated with the first mounting channel to form the containing cavity; and a third connecting part is formed at one end away from the tube body of the handle, a fourth connecting part is formed at one end of the cover, and the fourth connecting part is connected to the third connecting part.

3. The probe according to claim 2, wherein the first connecting part is a first thread, the second connecting part is a second thread, and the first connecting part is threadedly connected to the second connecting part.

4. The probe according to claim 2, wherein the third connecting part is a third thread, the fourth connecting part is a fourth thread, and the third connecting part is threadedly connected to the fourth connecting part.

5. The probe according to claim 2, wherein the first connecting part comprises a plurality of convex protrusions, and the plurality of convex protrusions are arranged at intervals at a circumferential direction of the tube body;

the second connecting part comprises a plurality of clamping grooves, and the plurality of clamping grooves are arranged at intervals at inner wall of the handle; and each of the convex protrusions is correspondingly snapped with one of the clamping grooves.

6. The probe according to claim 2, wherein the body is a ceramic body and the cover is a stainless-steel cover.

7. The probe according to claim 2, wherein an anti-slip layer is arranged at a surface of the body.

8. The probe according to claim 1, wherein the tube body is a stainless-steel tube.

9. The probe according to claim 1, wherein a shape of the probe part comprises at least any one of a cone or a polygonal pyramid.

10. The probe according to claim 1, wherein the elastic member comprises at least any one of a spring, an air cushion, an elastic rubber, an elastic support.

* * * * *